United States Patent [19]
Napor

[11] 3,914,475
[45] Oct. 21, 1975

[54] METHOD AND MEANS FOR FORMING COMPOSITE PLASTIC AND WOODEN MEMBERS

[76] Inventor: Carl A. Napor, 19 Victor Ave., Glen Ridge, N.J. 07028

[22] Filed: Jan. 10, 1973

[21] Appl. No.: 322,538

[52] U.S. Cl. .................. 427/291; 117/57; 117/72; 117/93.4 R; 117/104 R; 117/111 C; 117/111 R; 117/116; 117/148; 34/13.8; 264/138; 427/325
[51] Int. Cl. ............................ B44d 1/26; B27k 5/04
[58] Field of Search ........ 117/148, 72, DIG. 6, 147, 117/57, 47 R, 116, 104 R, 111 C, 111 R, 17, 93.4 R; 144/134 R; 52/716; 21/7; 34/13.8

[56] References Cited
UNITED STATES PATENTS

| | | | |
|---|---|---|---|
| 2,516,467 | 7/1950 | Kenyon | 117/57 |
| 2,573,105 | 10/1951 | Lehman | 117/57 |
| 3,544,699 | 12/1970 | Schock | 117/57 |
| 3,624,233 | 11/1971 | Goulet | 117/47 R |

FOREIGN PATENTS OR APPLICATIONS
610,112  10/1960  Italy .............................. 117/DIG. 6

Primary Examiner—William R. Trenor
Attorney, Agent, or Firm—Holland, Armstrong, Wilkie & Preirto

[57] ABSTRACT

The invention is a new method and means for economically and rapidly manufacturing wooden articles, such as furniture. A structural member of a piece of furniture as, for example, an arm or leg having a particular preferred shape is formed to that shape in a series of steps. First there is an initial rough shaping by cutting or sawing to obtain a blank of an approximate size. Thereafter, the blank is formed to the necessary curved or other intricate shapes by various rapid, low cost manufacturing operations, which may include a molding in a shaping die which crushes the blank to form it. This illustrative crushing step forms an approximately shaped member with no attempt being made to produce a smooth final surface on the member. In a further step, the exact final shaping of the member and the repair of any cracks or fissures is obtained by applying a liquid plastic, with or without an adhesive, over the surface of the article, sometimes within a mold, thereby completing the member so that it has a smoothly shaped outer surface and with the completed member having the advantages of the strength and low cost of the shaped wooden core. Coloring or finishing operations may follow as desired.

10 Claims, 11 Drawing Figures

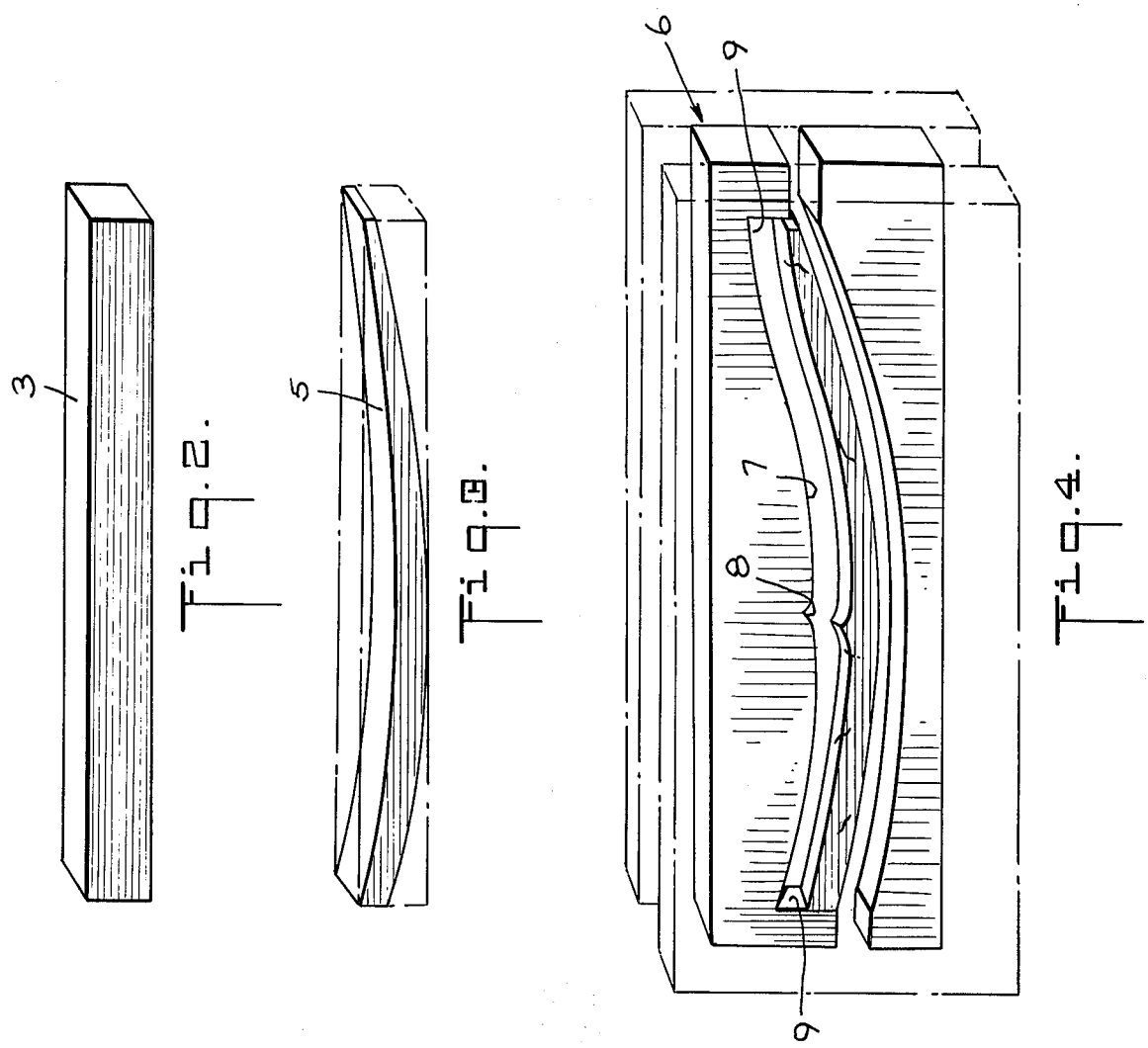
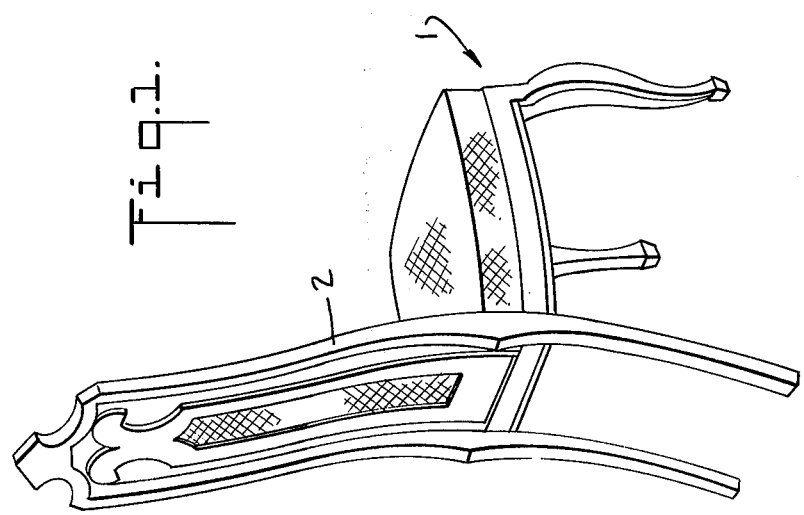

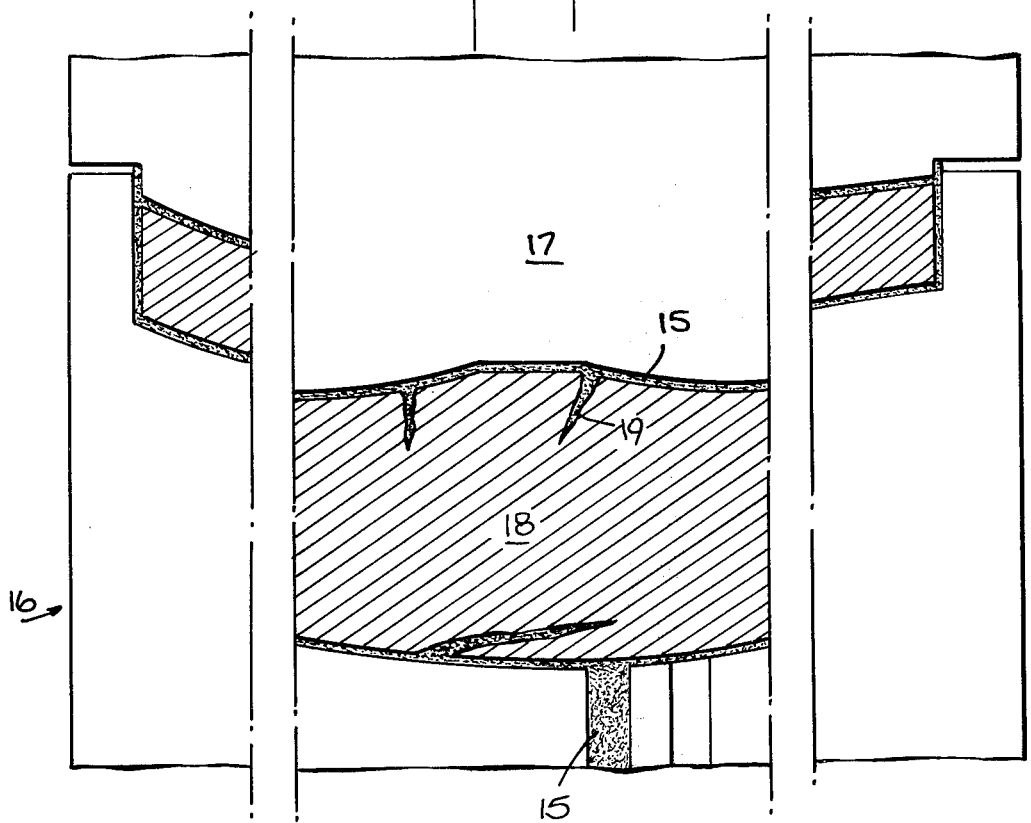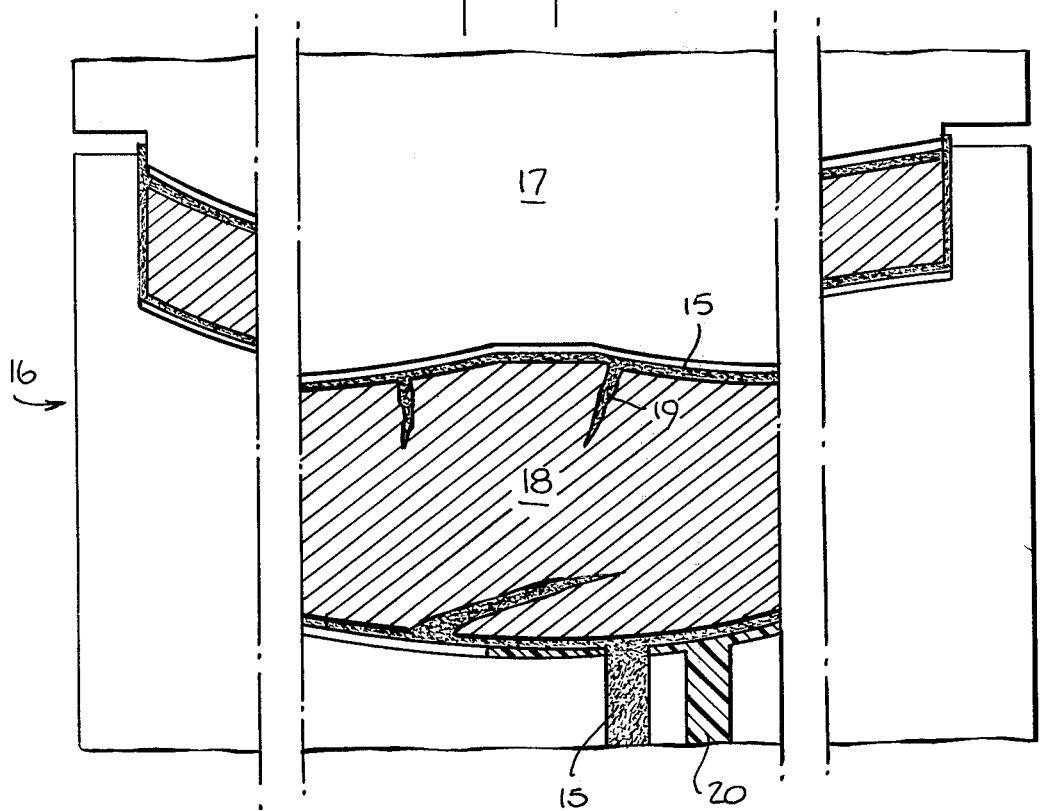

METHOD AND MEANS FOR FORMING COMPOSITE PLASTIC AND WOODEN MEMBERS

BACKGROUND OF THE INVENTION

A number of manufactured articles and particularly articles of furniture are traditionally made of wood for purposes of good appearance and also to take advantage of the unique strength to weight ratio for wood as well as its relatively low cost. There are, however, a number of disadvantages in the manufacture of furniture and similar articles from wood since even with the use of modern machine tools, there remains a relatively large number of steps in the shaping and fastening of wooden elements which require a high percentage of skill and labor. For these same reasons, the fastening of wooden structural members also is a time consuming operation which is not adaptable to highly automated and low cost manufacturing operations.

Attempts have been made to reduce the hand or semi-automatic operations by forming these structural members completly, or substantially completely, of molded plastic. Molded members have been made which have an excellent appearance and which may be rapidly made with intricate shapes. However, these molded plastic members are expensive due to the high cost of the suitable plastics and when made with sufficient strength to match the inherent strength of the wooden members, the plastic members have been found to be relatively heavy.

Traditionally, for example, fine furniture has been made of wood. The major reasons for the use of wood in furniture is its value as an inexpensive structural member while its decorative and unique grain pattern and color adds to the beauty of the article. There are thousands of woods, but about forty species are utilized and about 10 are mainly employed in furniture. Most of these woods are relatively inexpensive as a raw material and cost less than 5 cents per pound.

To be suitable for furniture, wood must first be dried to remove the large moisture content of the green condition. As grown, wood has a moisture content of 30% or more. Wet wood is not useful for wood products since its strength is about one-fourth that of dry wood and as wet wood swells and shrinks nonuniformly, cracks and undergoes distortion. When dried to a moisture content of 5% or less, however, the wood cellular construction provides a material whose stiffness, strength and flexibility combine to produce an excellent structural member. Wood has established itself as a good structural member ever since man became a craftsman.

An analysis of strength-weight-ratios of wood and steel shows a good comparison between wood and steel with wood being even more flexible than steel. Even with a plentiful supply of steel, wood still has continued to be used as a structural member since it is less expensive as a raw material than is steel.

The processing of trees into timber and then into usable wood products such as furniture, however, has always required the use of considerable labor. While wood is beautiful along the grain, the wood ends form unattractive fibrous ends. Therefore, wood furniture is usually made up of core assemblies banded together to exhibit its beautiful and unique grain at all areas. Also while wood is flexible, its use as a structural member demands the use of sizable cross-sectional areas. These areas cannot be bent or molded without crushing or non-uniformly deforming the cellular construction.

The methods of working and processing wood require many steps, each of them contributing hand labor. A typical operation performed in making conventional wood furniture may involve as many as thirty steps.

At each operation, damage can occur since wood is easily scratched, marred, bruised, or dented. Wood parts for furniture are also bulky and require time to handle so that a factory making wood products requires large areas for storing goods in process. The scheduling of parts through such a manufacturing system is difficult to control thereby adding to costs since the final assembly requires all parts to be available before the article can be completed. For example, a typical wooden chair requires many hours of labor to produce and more than thirteen different types of machine tools.

Thus, the many operations on wood, its bulkiness, its need to be handled carefully, its long scheduling through the plant, its assembly delays, and its finishing problems combine to require a large labor factor in wood products, especially furniture.

Furniture is also made today using molded plastics which permit elaborate designs without the accompanying hand assembly labor required where wood is used. Thus, molded plastic furniture can use more detailed styling than is possible in wood furniture.

Another reason for the use of plastic is that plastic parts are lower in price than comparable wood parts even though the price of the raw material for plastics is four to 10 times that of raw lumber. This is because the plastic part is completed in one or two operations as compared to the many operations required to finish wood parts.

However, most consumers demand that plastic furniture have physical properties equivalent to those of wood, such as the durability and repairability of wood, equivalent appearance and feel, as well as the sound of the wood. While more elaborate styling supposedly is possible in plastic furniture, the high mold costs tend to limit the number of styles manufactured.

The physical properties of plastic are such that structural members of plastic are neither as strong nor as durable and repairable as wood. The modulus of flexure, for example, of the more common plastics used in plastic furniture are one-eighteenth to one-sixteenth that of wood. Their impact strength is also lower and where temperatures above 110°F are encountered, many thermoplastics rapidly lose their strength and shape.

Accordingly, an object of the present invention is to provide a new method and means for manufacturing furniture and similar items in a rapid and automatic process with a minimum of hand labor and simultaneously to provide such a process which utilizes and takes advantage of the unique strength to weight ratio and low cost of wood.

Another object of the present invention is to provide a new method and means for manufacturing wooden articles such as furniture and the like.

Another object of the present invention is to provide a method and means of forming intricately shaped composite plastic and wooden structural members in an automatic process.

Another object of the present invention is to provide a structural member for furniture or the like which combines the high strength, light weight and low cost of wood with the smooth finishing properties of a plastic material.

Another object of the present invention is to provide a method of manufacturing furniture and the like which is capable of high speed automated operation.

Another object of the present invention is to provide a method of manufacturing furniture using small volumes of expensive and high strength plastic for an outer coating with a shaped larger volume wooden core.

Other and further objects of the invention will be obvious upon an understanding of the illustrative embodiment about to be described or will be indicated in the appended claims, and various advantages not referred to herein will occur to one skilled in the art upon employment of the invention in practice.

Briefly summarized, the new method utilizes a forming step where the desired wooden member is first roughly cut to shape and is thereafter more completly shaped including the curved and recessed portions by a rough molding, stamping, extruding, or crushing operation where certain portions of the wood are reshaped in a high-pressure operation. This shaping is possible since the reshaped surfaces of the wood are permitted to include cracks and breaks and roughened areas resulting from the shaping action and which thereafter are concealed by the application of the relatively thin overcoating of a flowable and hardenable plastic. Thus, in three successive and relatively simple steps, an intricate composite structurel member for an article of furniture or the like is formed which combines the high strength and low cost of wood with a plastic having compatible properties and with a corresponding low cost since only a small quantity of the plastic is needed as a coating and repair filling.

BRIEF DESCRIPTION OF THE DRAWING

A preferred embodiment of the invention has been chosen for purposes of illustration and description and is shown in the accompanying drawings forming a part of the specification, wherein:

FIG. 1 is a perspective view of a typical chair adaptable for being manufactured by the method and means of the present invention.

FIGS. 2 through 4 are perspective views illustrating successive steps in the shaping operation in accordance with the present invention.

FIGS. 9, 10 and 11 are enlarged detailed cross-sectional views of an alternate embodiment of the method using an adhesive and a plastic coating.

A PREFERRED EMBODIMENT OF THE FORMING METHOD

Figure 5:
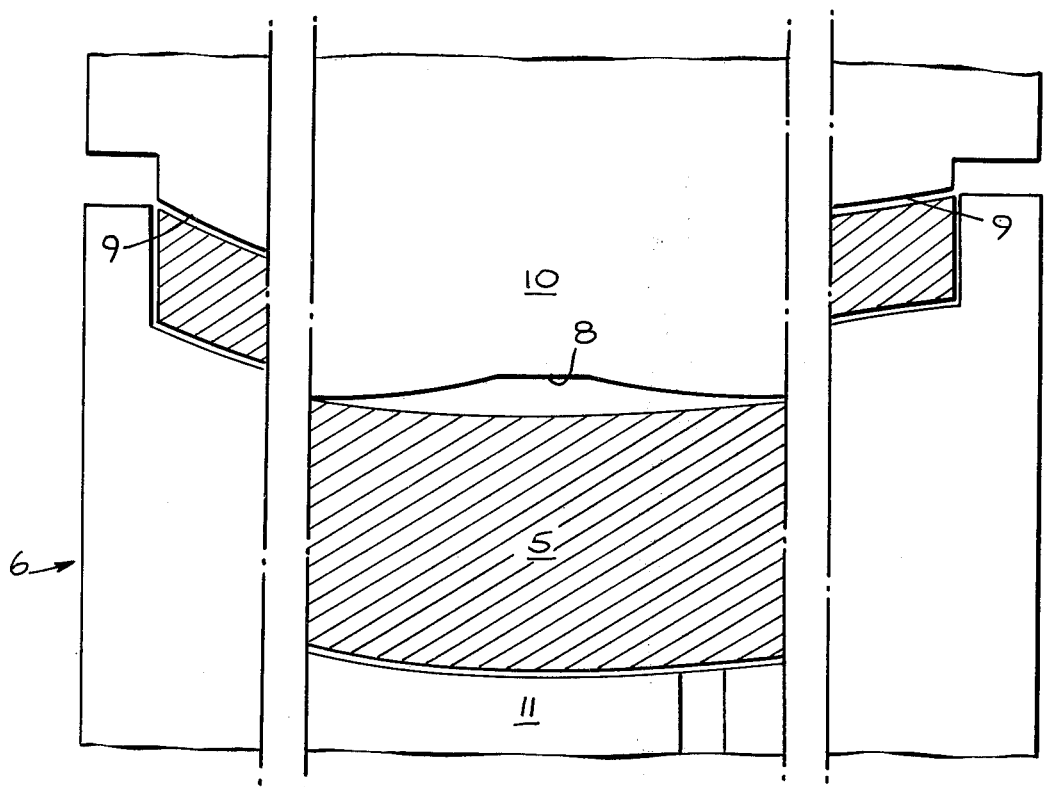
FIGS. 5, 6, 7 and 8 are enlarged detailed cross-sectional views illustrating the molding and plastic coating steps.

A preferred or basic process will now be described for forming a structural member as, for example, a chair arm or leg. An initial step in this preferred process as well as in addition embodiments of the process which will be described below, is a preliminary mechanical shaping of the member from a wooden blank cut to the approximate size and shape. This shaping step is a mechanical process whereby the roughly shaped blank is further shaped to include the various curved or cut-out or other more intricate portions of the furniture member. A number of shaping techniques may alternatively be utilized in this step it will be seen that these mechanical steps, when practiced in accordance with this invention, all include a relatively rough shaping action wherein the wooden blank is reduced to a form slightly smaller than the final shape of the member and with the shaping action being characterized by unobjectionable and relatively rough cutting, crushing or bending of the wooden blank.

This initial mechanical shaping, for example, may include cutting, sawing, die cutting, drilling, punching and routing operations and more particularly, in view of the expected intricate shapes to be formed, will include a moulding or compression shaping operation where the wooden blank is crushed or compressed in a die cavity to the approximate final shape desired. As will be apparent from the following discussion of the adhesive bonding and plastic coating steps, this moulding operation may be done rapidly and in a manner which may crack or bend or otherwise mar the surface of the wooden blank with this result being unobjectionable in view of the subsequent restoration steps provided by the adhesive coating and the outer blank coating steps.

FIGS. 2-4 illustrates a moulding operation for a rounded and curved member such as a chair leg 2 for the chair 1 as shown in FIG. 1. The rough cut blank 3 is first illustrated in FIG. 2. FIG. 3 shows the blank 3 after an automated and relatively simple sawing operation has formed curved outlines for an improved blank 5 somewhat approximating the final form of the member. FIG. 4 shows a die 6 with a shaping cavity 7 having a generally curved overall form including more intricate shaped local portions such as the raised center section 8 and especially shaped end portions 9 such as might be typical for a rounded and intricately shaped end of such a chair leg 2. The rough cut blank 5, after its preliminary shaping as illustrated in FIG. 3, is placed in the die 6 and the die is rapidly closed thereby compressing and forcing the wooden blank 5 into the shape of the die cavity 7.

FIG. 5 is an enlarged illustration of the end and central portions of the die 6 showing the rounded or more intricately shaped areas of the die 6 prior to the closing or moulding operation when the upper or movable section 10 of the die 6 is brought down towards the stationary lower portion 11 of the die 6.

Figure 6:
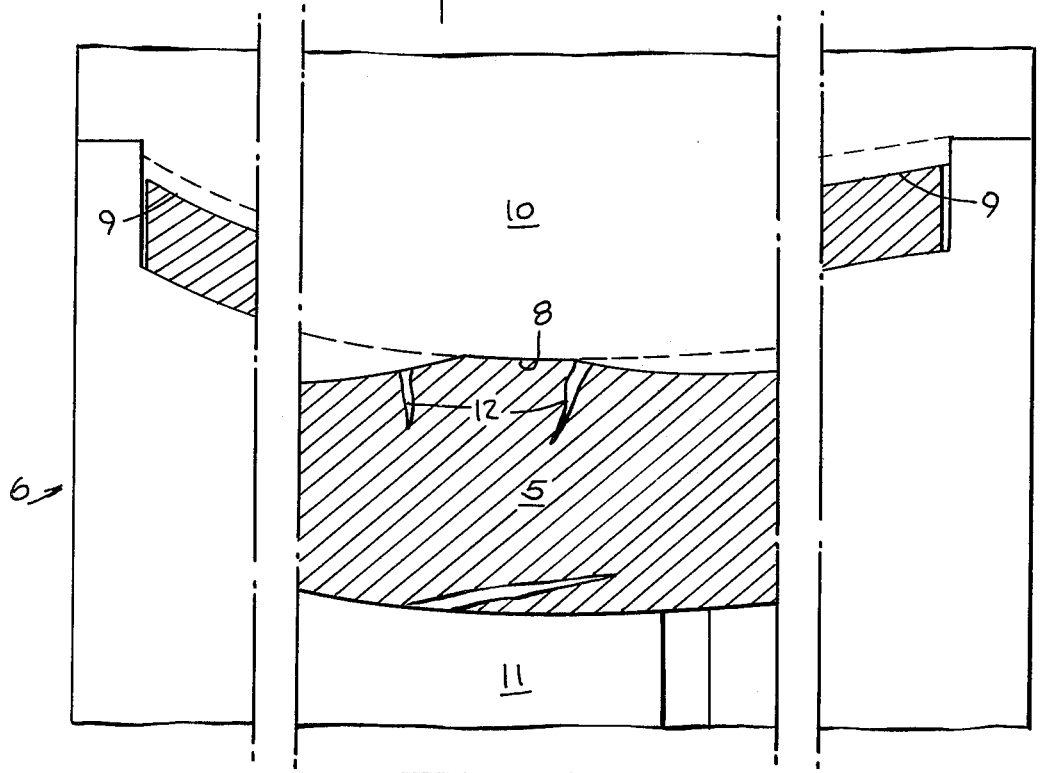

FIG. 6 is a sectional view similar to FIG. 5 illustrating the upper die section 10 in its fully lowered position at the termination of the compression moulding step. The corresponding shaping of the wooden blank 5 is illustrated and a number of typical cracks or tears 12 are shown resulting from the rather severe shaping action of the mould cavity surfaces against the relatively rigid wooden blank 5.

Figure 7:
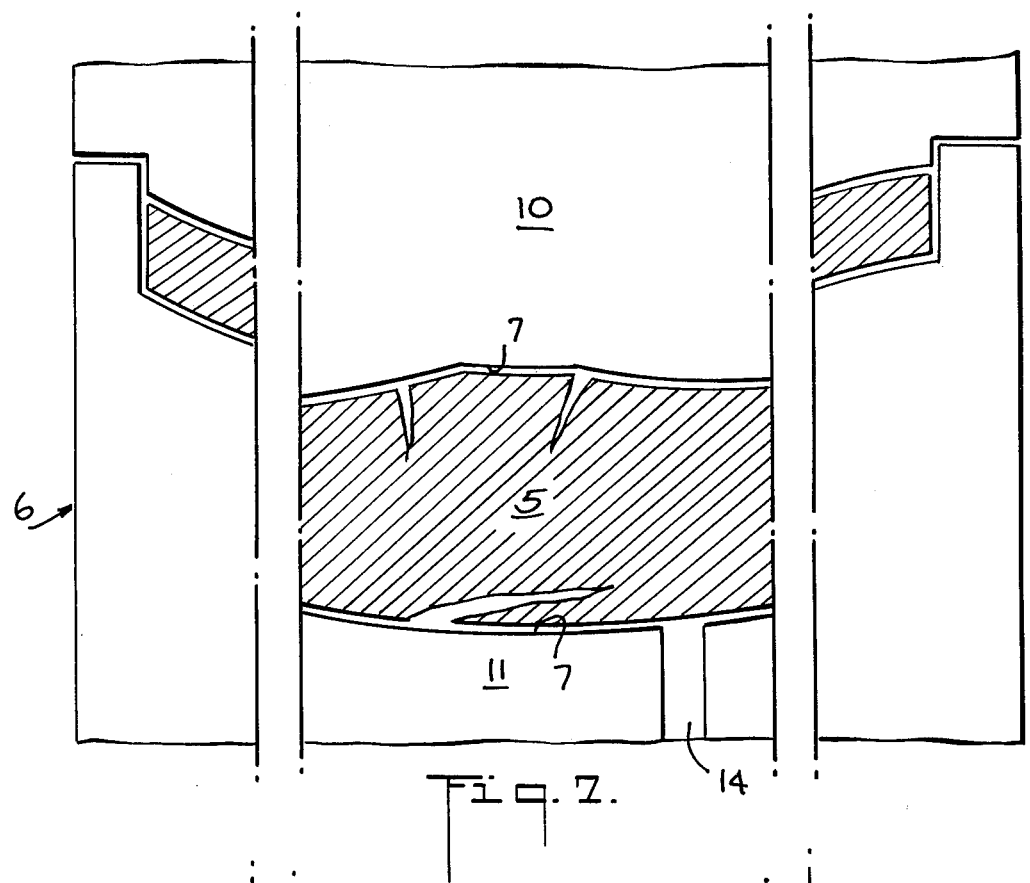

FIG. 7 is a sectional view corresponding to FIGS. 5 and 6 showing the upper die section 10 in a pulled back position resulting in the formation of a slight spacing between the surfaces of the moulded blank 5 and the die cavity 7 surfaces. In this position, the blank 5 is ready for the injection of a coating plastic into the space between the blank 5 and the die 6, as well as into the cranks and other imperfections 12 resulting from the above described compression shaping or moulding steps.

Figure 8:
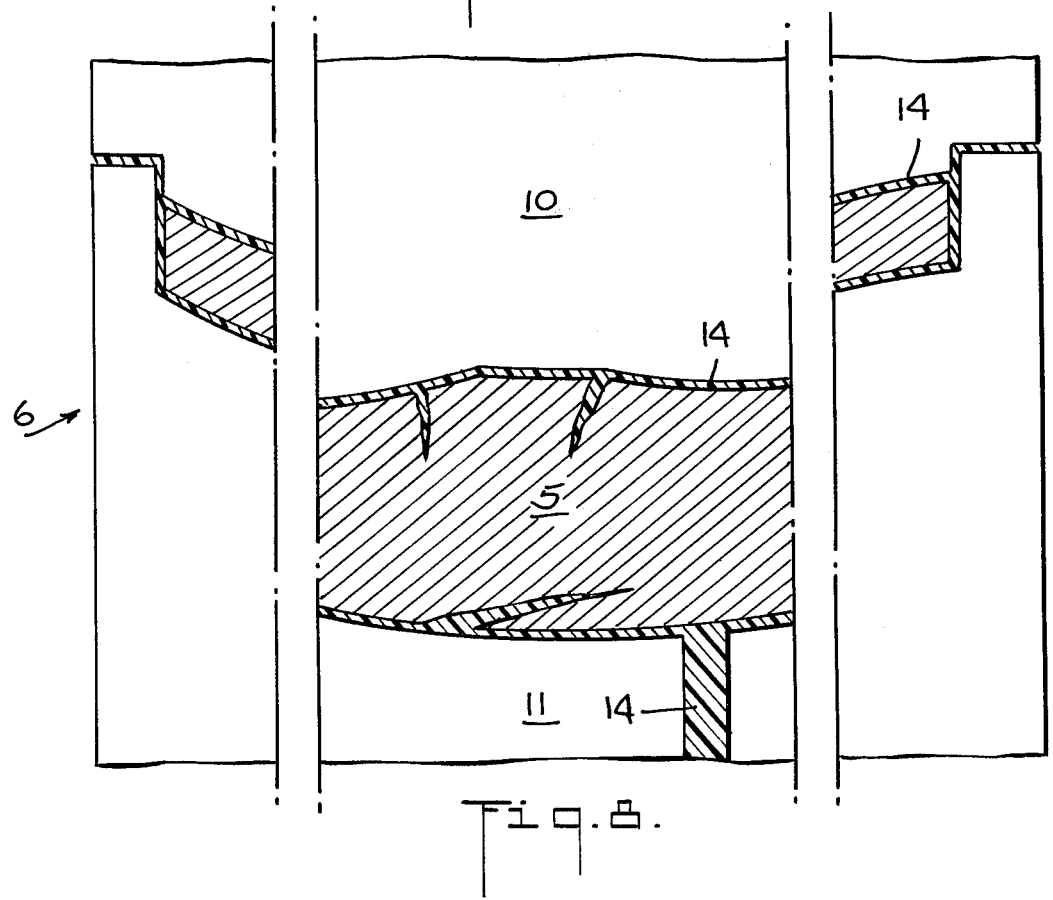

FIG. 8 illustrates the final step where the coating plastic has been injected into the die 6 through the inlet nozzle 14. The outer surface of the plastic coating now conforms to the desired outer shape of the structural member, i.e., the furniture leg 2. This provides for a simultaneous structural repair and restoration of the outer surface of the member 2. A variety of plastics may be used in this step including plastics having adhesive properties with respect to the wooden core and including plastics of the heat setting type for permitting a rapid completion of the coating step.

The following is a list of plastic suitable for such a coating step. This list is representative but not all inclusive of plastics suitable for such a coating process.

The outer plastic coating may be chosen from the group comprising ABS, acetal, acrylic, cellulosis, fluorcarbons, nylons, polyvinyl chloride, polycarbonate, polyethylene, polypropylene, polystyrene, ethyl cellulosic, tetrafluoroethylene, epoxy melamine, amino derivatives, phenobis, polyester, polyurethane, diallyphthalate, polyethlene terephthalate, and phenol formaldehyde.

Figure 11:
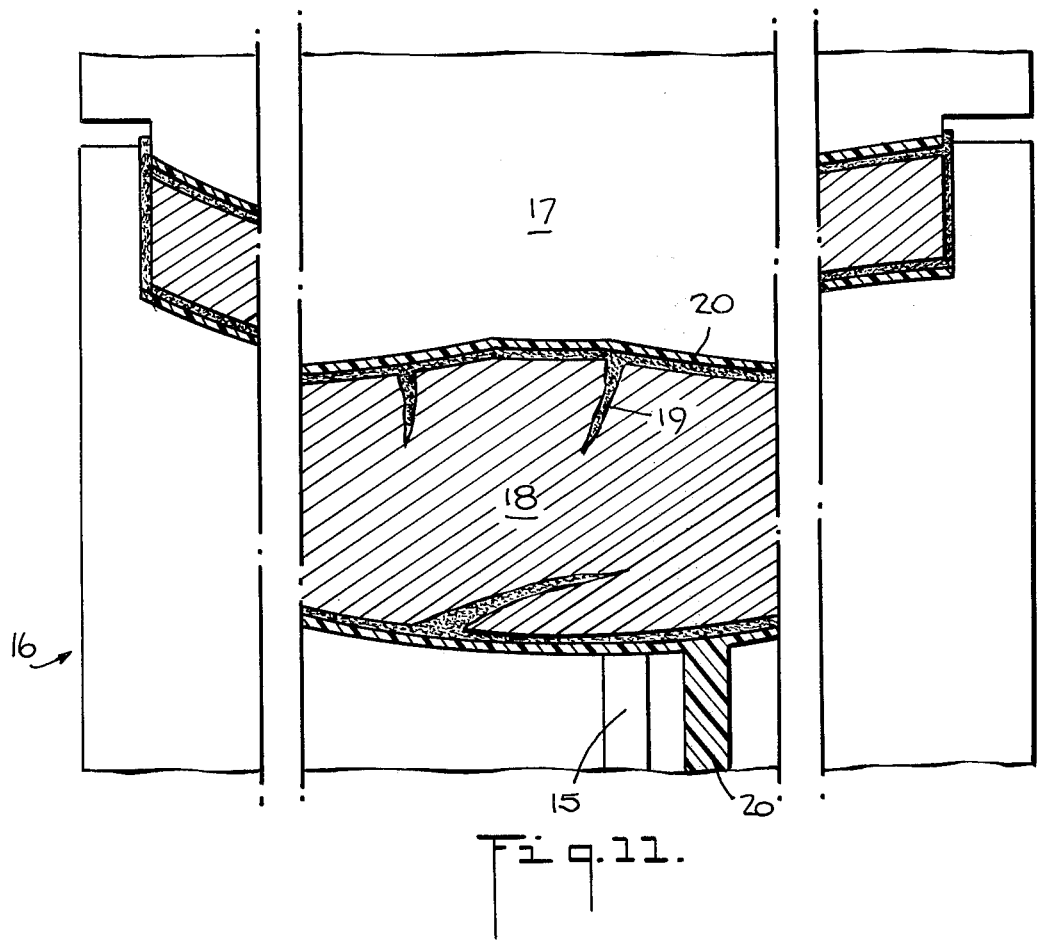

FIGS. 9, 10 and 11 are generally similar diagrammatic cross-sectional views showing another embodiment wherein the coating step is performed with two successive coating operations. In the first coating operation, an adhesive 15 is injected as illustrated in FIG. 9 into the die 16 after the forming action as the movable die section 17 is pulled back a slight amount for performing the structural repair and restoration of the inner wooden core 18 and so that the adhesive 15 fills the cracks and other imperfections 19. Thereafter, the movable die section 17 is drawn further back as seen in FIG. 10 for the second injection of the preferred outer plastic coating material 20 is illustrated in FIG. 11. This two-step operation is performed in cases where it is desired to improve the bond between the preferred outer coating and the inner wooden core 18 and an adhesive 15 is chosen which is compatible in adhesive sense to both the wooden core 18 and the outer coating plastic 20.

The following adhesives are representative of those suitable.

The adhesive may be from the group comprising wood glue, diallylphthalate, epoxy, melamine, phenolic, polyester, urea, polyethylene terephthalate, natural rubber, neoprene, nitrile, urethane, cellulose nitrate, phenolic-polyvinyl butyral, rubber latices or a resin emulsion.

A method of applying coatings of plastic or of adhesive and plastic has been described above utilizing a mold or encapsulating device. A number of other methods also may be utilized for the coating operation and particularly for the plastic coating operation.

One additional method useful for such a coating operation is known as fluidized-bed powder coating. This known type of coating operation, in general, includes a heating of the member to be coated followed by an immersion of the heated member into a powder where the powder is agitated or fluidized by a continuous passage of air upwardly through the powder. The thickness of the plastic coating is controlled by the time during which the member is suspended in the powder. In addition, other known types of coating operations may be performed such as electrostatic coating or dip coating as well as spray coating in the cases where the appropriate plastic may be conveniently applied in the form of a liquid spray. On certain members a wipe-on or brush-on coating operation may also be employed either as the principal coating method or as an auxillary operation in combination with any of the other coating operations as discussed above.

A number of adhesives have been listed above as being suitable for providing a bond between the wood surface of the shaped wooden member and the outer plastic coating. These adhesives are chosen so that they assure the attachment of the plastic coating to the wood and, in general, this effect is obtained by chosing an adhesive which is operative simultaneously with the particular wood being used and the particular plastic being used for the above-described final shaping operation. There are a number of different adhesives in general catagories which are available for bonding certain groups of plastics including those most commonly used and suitable for the plastic coating operation described herein. Each of the plastics preferably is used with a particular adhesive or an adhesive selected from an appropriate group with the adhesives being selected on the basis of certain general criteria including (1) the stresses to which the member and its bonding joints are to be subjected (2) the particular shaping of the surface and its size (3) the particular destructive or damaging environmental elements to which the plastic coated member will be subjected. The following Table 1 gives a general guide as to preferred pairings of adhesives and plastics.

TYPICAL ADHESIVES FOR BONDING PLASTICS TO WOOD

| Plastics | Adhesives |
| --- | --- |
| Acrilonitrile-butadiene-styrene | Epoxy |
| Acetal | Epoxy |
| Acrylic | Neoprene, Nitrile and *Resin Emulsions |
| Cellulosics | Nitrile |
| Fluorocarbons | Epoxy |
| Nylon | Neoprene and Nitrile |
| Polyvinylchloride | Nitrile, Epoxy, Polyester and *Resin Emulsions |
| Polycarbonate | Epoxy and Polyester |
| Polyethylene | Neoprene and *Rubber latices |
| Polypropylene | Natural rubber and *Rubber latices |
| Polystyrene | Phenolic-Polyvinyl Butyral and Polyester |
| Ethyl cellulose | Cellulose nitrate |
| Tetra-Fluoro ethylene | Epoxy |
| Epoxy | Epoxy and phenolic-Polyvinyl Butyral |
| Melamines & Ureas | Neoprene and Nitrile |
| Phenolics | Neoprene and *Resin Emulsions |
| Polyesters | Neoprene |
| Polyurethanes | Polyester |

* Water Based.

When the plastic coating operation is completed as, for example, after the removal of the coated member from the encapsulating molds, the outer surface of the plastic may be finished in a number of ways to provide the particular appearance desired for the completed member. Most furniture has an outer coating known as a barrier coating for providing good abrasion resistance as well as suitable adhesive properties for the final stain or other finish being used. The plastic coatings for the members, as already discussed above, in many cases will provide such a suitable barrier coat; however other final outer plastic coatings may be used if needed.

A final decorating method is used in the present method which may comprise regular plastic finishing techniques with varnishes or lacquer as well as well-known hot stamp, label transfer, decal transfer, silk screen, offset printing or electrostatic printing.

The transfer process may include the application of a thin grain finished vinyl sheet to the plastic surface giving the desired appearance. This method is particularly advantageous since it requires only the use of an adhesive and the printed finished vinyl sheeting.

It will be seen that these various finishing operations, in general, may be performed on the plastic coated members of the present method in a manner generally similar to their use on members formed by conventional methods including wooden members shaped by conventional operations or completely molded plastic members.

It will be seen that an improved method has been provided for forming articles, such as furniture, in which the best properties of wood and plastic have been combined to produce the article by a simplified and rapid manufacturing operation which is capable of providing finished articles having relatively complicated curved or stylized sections.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A method of forming a composite article of wood and a polymeric material having a predetermined final shape comprising the steps of:

shaping a wood core member by substantially destroying its structural integrity by partially crushing and cracking the member causing it to take a shape smaller than but generally corresponding to the predetermined final shape;

thereafter repairing the damaged wood core by applying a thermosetting or thermoplastic polymeric material which enters and fills the damaged portions of the wood core without substantially impregnating the core whereby the composite article has a substantial portion of the original strength of the wooden member; and forming an outer layer of polymeric material of random thickness by applying and hardening the polymeric material on the repaired article thereby completing the shape of the composite article to the said predetermined shape.

2. The method as claimed in claim 1 in which the destruction of the structural integrity comprises the further step of cutting the wood member.

3. The method as claimed in claim 1 in which the polymeric material is selected from the group consisting of, acetal, acrylic, cellulosic, fluoro-carbons, nylons, polyvinyl chloride, polycarbonate, polyethylene, polypropylene, polystyrene, epoxy, melamine, phenolics, polyester and polyurethane.

4. The method as claimed in claim 1 in which the application of the polymeric material comprises a fluidize-bed coating operation.

5. The method as claimed in claim 1 in which the application of the polymeric material comprises the steps of positioning the damaged wood core in a die cavity larger than the wood core, and forcing the polymeric material in the cavity between the wood core and the walls of the cavity.

6. The method as claimed in claim 1 in which the applying of the polymeric material comprises an electrostatic coating operation.

7. The method as claimed in claim 1 in which the applying of the polymeric material comprises a dip coating operation.

8. The method as claimed in claim 1 in which the applying of the polymeric material comprises a spray coating operation.

9. The method as claimed in claim 1 in which the applying of the polymeric material comprises wipe-on coating operation.

10. The method as claimed in claim 1 in which the applying of the polymeric material comprises a brush-on operation.

* * * * *